(12) United States Patent
El Defrawy et al.

(10) Patent No.: US 9,443,089 B1
(45) Date of Patent: *Sep. 13, 2016

(54) SYSTEM AND METHOD FOR MOBILE PROACTIVE SECRET SHARING

(71) Applicant: HRL Laboratories, LLC, Malibu, CA (US)

(72) Inventors: Karim El Defrawy, Santa Monica, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/207,321

(22) Filed: Mar. 12, 2014

Related U.S. Application Data

(60) Provisional application No. 61/780,638, filed on Mar. 13, 2013.

(51) Int. Cl.
*G06F 21/00* (2013.01)
*G06F 21/60* (2013.01)

(52) U.S. Cl.
CPC .................................... *G06F 21/60* (2013.01)

(58) Field of Classification Search
CPC . H04L 63/065; H04L 9/3218; H04L 9/3013; H04L 9/3255
USPC ......................................................... 726/26
See application file for complete search history.

(56) References Cited

U.S. PATENT DOCUMENTS

| 4,633,470 A | 12/1986 | Welch et al. |
| 5,625,692 A * | 4/1997 | Herzberg et al. ............. 380/286 |
| 7,313,701 B2 * | 12/2007 | Frankel et al. ............... 713/180 |
| 2010/0037055 A1 * | 2/2010 | Fazio et al. ................... 713/171 |

OTHER PUBLICATIONS

Harn, Lein, and Changlu Lin. "Strong (n, t, n) verifiable secret sharing scheme." Information Sciences 180.16 (2010): 3059-3064.*
Eli Ben-Sasson, Serge Fehr, and Rafail Ostrovsky, Near-linear unconditionally-secure multiparty computation with a dishonest minority. Cryptology ePrint Archive, Report 2011/629. 2011.
Zuzana Beerliova-Trubniova and Martin Hirt. Ecient multi-party computation with dispute control. In TCC, pp. 305-328, 2006.
Rafail Ostrovsky and Moti Yung. How to withstand mobile virus attacks (extended abstract), In PODC, pp. 51-59, 1991.
Elwyn R. Berlekamp. Algebraic Coding Theory. Aegean Park Press. Chapter 7, 1984.

(Continued)

*Primary Examiner* — Syed Zaidi
(74) *Attorney, Agent, or Firm* — Tope-McKay & Associates

(57) ABSTRACT

Described is a system for mobile proactive secret sharing. The system utilizes a Secret-Share protocol to share, by server $P_j$, a secret s among a set of servers $\wp$, such that a degree of polynomials used to share the secret s is d and a shared secret is denoted as [s]. A GenPoly protocol is used to cause the servers in the set of servers $\wp$ to generate l random polynomials of degree D. A Secret-Redistribute protocol is used to redistribute the shared secret [s] to a set of new servers $\wp$'. Finally, a Secret-Open protocol is used to open the shared secret [s].

15 Claims, 3 Drawing Sheets

(56) References Cited

OTHER PUBLICATIONS

Michael Ben-Or, Shafi Goldwasser, and Avi Wigderson. Completeness theorems for non-cryptographic fault-tolerant distributed computation (extended abstract). In STOC, pp. 1-10, 1988.
Gabriel Bracha. An O(log n) expected rounds randomized byzantine generals protocol. J. ACM, 34(4):910-920, 1987.
Zuzana-Beerliova-Trubiniova and Martin Hirt. Perfectly-secure mpc with linear communication complexity. InTCC, pp. 213-230, 2008.
Christian Cachin, Klaus Kursawe, Anna Lysyanskaya and Reto Strobl, Asynchronous verifiable secret sharing and proactive cryptosystems. In ACM Conference on Computer and Communications Security, pp. 88-97, 2002.
Ivan Damgard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard, Perfectly secure multiparty computation and the computational overhead of cryptography. In EUROCRYPT, pp. 445-465, 2010.
Yvo Desmedt and Sushil Jajodia. Redistributing secret shares to new access structures and its applications. Jul. 1997. Technical Report ISSE TR-97-01, George Mason University.
Ivan Damgard and Jesper Buus Nielsen. Scalable and unconditionally secure multiparty computation. In CRYPTO, pp. 572-590, 2007.
Michael J. Fischer and Nancy A. Lynch. A lower bound for the time to assure interactive consistency. Inf. Process. Lett., 14(4):183-186, 1982.
Matthew K. Franklin and Moti Yung. Communication complexity of secure computation (extended abstract) In STOC, pp. 699-710, 1992.
Shuhong Gao. A new algorithm for decoding reed-solomon codes. In Communications, Information and Network Security, Editors V.Bhargava, H.V.Poor, V.Tarokh, and S.Yoon, pp. 55-68. Kluwer, 2002.
Juan A. Garay and Yoram Moses. Fully polynomial byzantine agreement in t+1 rounds. In STOC, pp. 31-41, 1993.
Oded Goldreich. Foundations of Cryptography: vol. 2, Basic Applications. Cambridge University Press, Chapter 7, 2009.
Amir Herzberg, Stanislaw Jarecki, Hugo Krawczyk, and Moti Yung. Proactive secret sharing or: How to cope with perpetual leakage. In CRYPTO, pp. 339-352, 1995.
David Schultz. Mobile Proactive Secret Sharing. PhD thesis, Massachusetts Institute of Technology, 2007.
Theodore M. Wong, Chenxi Wang, and Jeannette M. Wing, Verifiable secret redistribution for archive system. In IEEE Security in Storage Workshop, pp. 94-106, 2002.
Christian Cachin, Klaus Kursawe, Anna Lysyanskaya, and Reto Strobl. Asynchronous verifiable secret sharing and proactive cryptosystems, In ACM Conference on Computer and Communications Security, pp. 88-97, 2002.
Ivan Damgard and Jesper Buus Nielsen. Scalable and unconditionally secure multiparty computation, In CRYPTO, pp. 572-590, 2007.
Yvo Desmedt and Sushil Jajodia, Redistributing secret shares to new access structures and its applications. Jul. 1997. Technical Report ISSE TR-97-01, George Mason University.
Torben P. Pedersen. Non-interactive and information-theoretic secure verifiable secret sharing. In Joan Feigenbaum, editor CRYPTO, vol. 576 of Lecture Notes in Computer Science, pp. 129-140, Springer, 1991.
David Schultz. Mobile Proactive Secret Sharing PhD thesis; Massachusetts Institute of Technology, 2007.
Adi Shamir. How to share a secret, Commun. ACM, 22(11)612-613, 1979.
Lidong Zhou, Fred B. Schneider, and Robbert van Renesse. Apss: proactive secret sharing in asynchronous systems. ACM Trans. Inf. Syst, Secur., 8(3):259-286, 2005.
Alfred V. Aho, John E. Hoperoft, and J. D. Ullman. The Design and Analysis of Computer Algorithms. Addison-Wesley, 1974, pp. 299-300.
Lidong Zhou, Fred B. Schneider, and Robbert van Renesse. Apss: proactive secret sharing in asynchronous systems. ACM Trans. Inf. Syst. Secur., 8(3):259-286, 2005.

\* cited by examiner

SYSTEM AND METHOD FOR MOBILE PROACTIVE SECRET SHARING

CROSS-REFERENCE TO RELATED APPLICATIONS

This is a non-provisional patent application of U.S. Provisional Application No. 61/780,638, filed Mar. 13, 2013, entitled, "An Efficient Protocol for Mobile Proactive Secret Sharing."

FIELD OF INVENTION

The present invention relates to a secret sharing system and, more particularly, to a system implementing mobile proactive secret sharing via a collection of protocols.

BACKGROUND OF INVENTION

Secret sharing is a process by which secrets are distributed among an arbitrary number of servers. A concern in secret sharing is the possibility of an adversary who may corrupt a fixed portion of the servers. When the adversary corrupts a server, it learns all information stored on that server. The adversary can force corrupt servers to behave arbitrarily, irrespective of the protocol. Thus, it is imperative to implement a secure secret sharing protocol.

As such, a number of researchers have devised various mobile secret sharing protocols. For example, a mobile secret sharing protocol was described by David Schultz in "Mobile Proactive Secret Sharing," PhD thesis, Massachusetts Institute of Technology, 2007, which is hereby incorporated by reference as though fully set forth herein. In Schultz' thesis, the threshold of corruption is lowered by employing "virtual servers" and having each real server keep these virtual servers' shares in memory. As admitted by Shultz, "[t]his approach is somewhat unsatisfying theoretically because using this method to reduce the threshold does not reduce the asymptotic computational overhead of the protocol."

Thus, a continuing need exists for a mobile proactive secret sharing protocol that allows for the number of servers used in the computation to decrease without relying on virtual servers to engage in the protocol.

SUMMARY OF INVENTION

Described is a system, method, and computer program product for mobile proactive secret sharing. The system, for example, includes one or more processors and a memory. The memory is a non-transitory computer-readable medium having executable instructions encoded thereon, such that upon execution of the instructions, the one or more processors performs several operations, such as initializing a Secret-Share protocol to share, by server $P_j$, a secret s among a set of servers $\wp$, such that a degree of polynomials used to share the secret s is d and a shared secret is denoted as [s]; initializing a GenPoly protocol to cause the servers in the set of servers $\wp$ to generate l random polynomials of degree D; initializing a Secret-Redistribute protocol to redistribute the shared secret [s] to a set of new servers $\wp$'; and initializing a Secret-Open protocol to open the shared secret [s].

In another aspect, initializing the Secret-Share protocol further comprises operations of:
  distributing the shared secret as follows:
    i. picking a random degree polynomial;
    ii. for each server, computing Pedersen commitments and broadcasting Pedersen commitments and encrypted shares;
  detecting an error as follows:
    i. for each server that receives the shared secret, decrypting the message and verifying that the Pedersen commitments correspond to the received shares;
    ii. for any server that detects that the Pedersen commitments do not correspond to the received shares, said server being an accusing server and broadcasting an accusation amongst the set of servers that a sending server is corrupt;
    iii. broadcasting, by the sending server, a defense to rebut the accusation;
    iv. for each server, determining if the defense is accurate, such that if the accusation is not correctly rebutted, server $P_j$ is added to a list of known corrupted servers Corr, and if the accusation is correctly rebutted, then the accusing server is added to Corr, with the protocol terminating if $P_j$ is not found to be corrupt.

In yet another aspect, initializing the GenPoly protocol further comprises operations of:
  distributing as follows:
    i. for each server $P_i$ that is not in the list of known corrupted servers Corr, generating random polynomials;
    ii. for each said server that generates random polynomials that is not in Corr, computing Pedersen commitments, with each server then broadcasting the Pedersen commitments and encrypted shares.
    iii. adding to Corr each server $P_i$ that did not broadcast Pedersen commitments;
  detecting error(s) as follows:
    i. for each server $P_i$ that is not in Corr, determining that each pair of shares received above corresponds to the Pedersen commitments;
    ii. for any server $P_i$ that detects that the Pedersen commitments do not correspond to the received pair of shares, said server being an accusing server and broadcasting an accusation amongst the set of servers that a sending server is corrupt;
    iii. if a server is accused, the accused server broadcasting a rebuttal defense that includes the correct pair of shares along with a randomness key that was used to encrypt a pair of values;
    iv. for each server, determining if the defense is accurate, such that if the accusation is not correctly rebutted, the accused server $P_i$ is added to a list of known corrupted servers Corr, and if the accusation is correctly rebutted, then the accusing server is added to Corr; and
    v. for each server $P_i$, computing its share of an output polynomial.

In another aspect, initializing the Scow-Redistribute protocol further comprises operations of:
  performing the GenPoly protocol in parallel to generate random polynomials;
  if a threshold is decreasing, then performing the following operations:

i. for each server $P_i$ that is not in the list of known corrupted servers Corr, broadcasting its share of a secret-sharing polynomial, masked with a random polynomial;

ii. for each server, verifying that the broadcast shares are correct given Pedersen commitments;

iii. constructing a polynomial of lower degree sharing the same secret by using correct shares;

transferring Pedersen commitments as follows:

i. for each server $P_i$ that is not in Corr, broadcasting Pedersen commitments for an old secret sharing polynomial for servers $S_j$ in a new group;

ii. for each server $S_j$, determining correct values for the Pedersen commitments broadcast in the previous step by a set of Pedersen commitments that are broadcast by a majority of the servers;

transferring shares and interpolating as follows:

i. for each server $P_i$ that is not in Corr computing shares of masked secret-sharing polynomials and broadcasting the encrypted shares;

ii. for each $S_j$, verifying that the encrypted shares broadcast above are correct given known Pedersen commitments;

iii. for each $S_j$, using all encrypted shares that are determined to be correct to interpolate new shares; and for each server $P_i$ in the set of servers, erasing all of its data.

In yet another aspect, initializing the Secret-Open protocol further comprises operations of:

for each server $P_i$, broadcasting its shares and signature for the shares;

for each server $P_i$, verifying for each pair of points that correspond to the broadcast shares, that the shares correspond to the Pedersen commitments; and for each server $P_i$, for all the points in which the shares correspond to the Pedersen Commitments, interpolating the secret.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
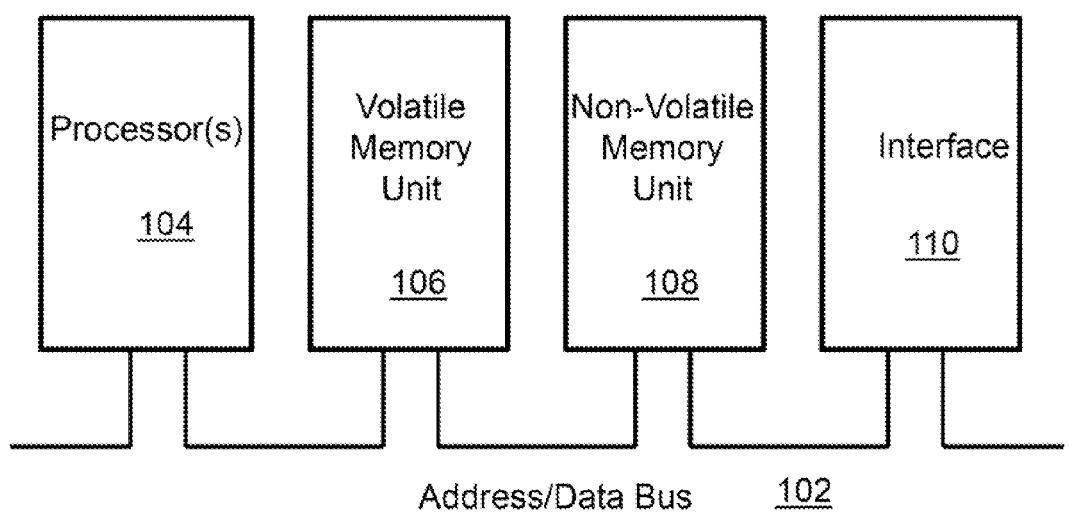
FIG. 1 is a block diagram depicting, the components of a system according to the principles of the present invention.
Figure 1:
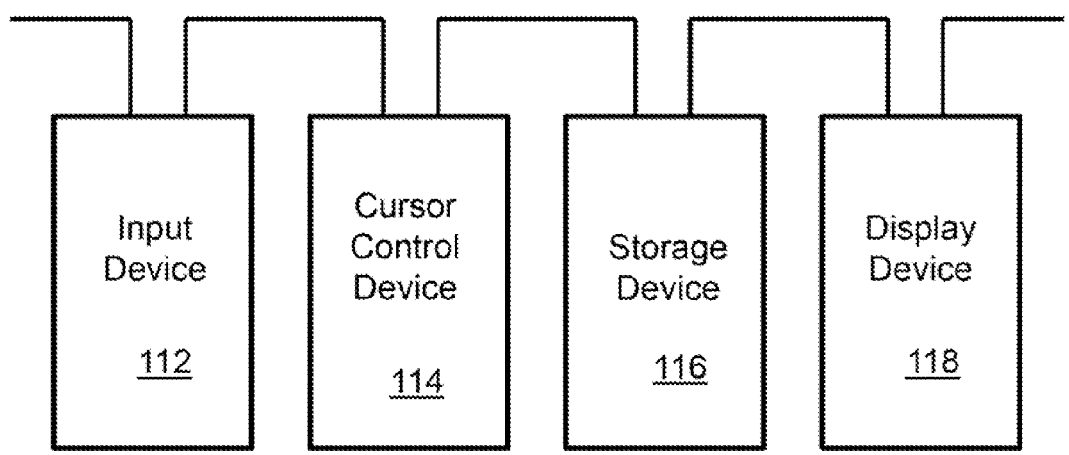

The present invention relates to a secret sharing system and, more particularly, to a system implementing mobile proactive secret sharing via a collection of protocols. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is a secret sharing system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited, to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including, memory-storage devices.

Figure 2:
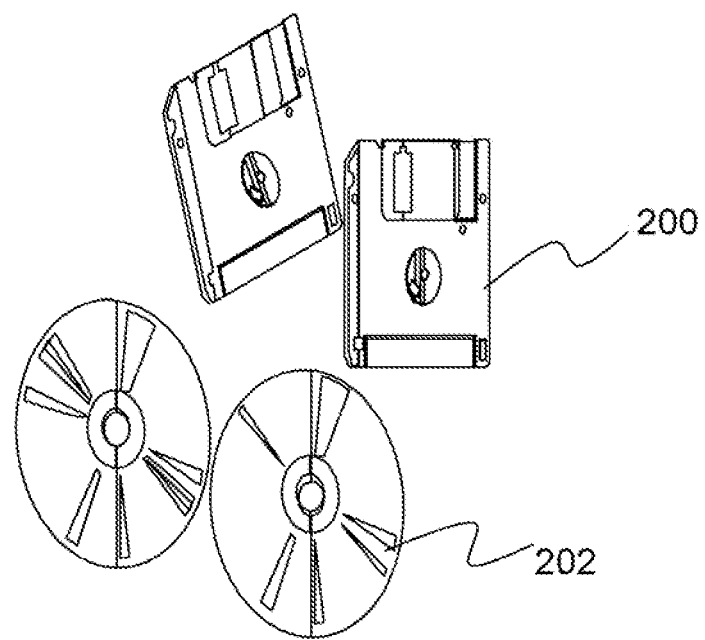
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The system according to the principles of the present invention incorporates a collection of protocols implementing mobile proactive secret sharing. The system allows a secret to be distributed among an arbitrary number of servers and dynamically transferred to a new set of servers, or redistributed among the same set of servers with fresh randomness. The threshold of corruption (which is the maximum number of servers that a malicious party can corrupt without revealing the secret) can be changed at each transferal/redistribution.

The protocol improves upon previously known mobile proactive secret sharing protocols in that it allows for the number of servers used in the computation to decrease without relying on virtual servers to engage in the protocol. Further, among those protocols secure against active adversaries, the protocol according to the principles of the present invention has the lowest communication complexity. This protocol can be used to securely store data distributed among a group of servers in such a way that if a malicious party captures a (limited) fraction of the data, then this data will "expire" after a given time. Any "expired" data gives the malicious party no information about the secret stored data. Thus, as can be appreciated by those skilled in the art, the present invention provides for a secure, mobile proactive secret sharing system.

(4) Specific Details of the Invention

Figure 3:
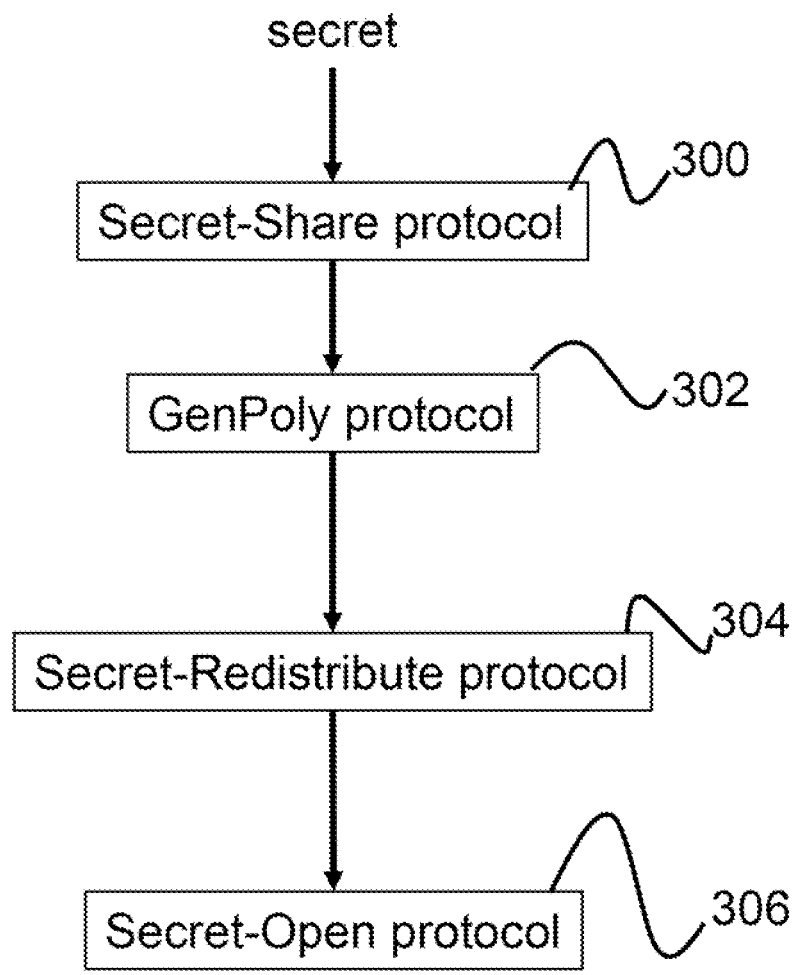
FIG. 3 is a flow chart illustrating a collection of protocols according to the principles of the present invention.

As shown in FIG. 3, system incorporates a collection of protocols that implement mobile proactive secret sharing. First, the system initializes a Secret-Share protocol 300 to share, by server $P_j$, a secret s among a set of servers $\wp$, such that a degree of polynomials used to share the secret s is d and a shared secret is denoted as [s]. Thereafter, a GenPoly protocol 302 is initialized to cause the servers in the set of servers $\wp$ to generate l random polynomials of degree D. A Secret-Redistribute protocol 304 is used to redistribute the shared secret [s] to a set of new servers $\wp$'. Finally a Secret-Open protocol 306 is used to open the shared secret [s]. Each of these will be described in further detail below.

The threshold of corruption, is t (i.e., the adversary can corrupt no more than t servers at any given time). The degree of the polynomials used to share the secrets is $$d = \left\|\frac{2+\epsilon}{2} \cdot t\right\| + 2,$$

and the number of servers is $$n = 2 \cdot \left\|\frac{2+\epsilon}{2} \cdot t\right\| + 5$$

(where $\|x\|$ is the floor of x and $\in$ is an arbitrary positive number chosen by the administrator who is setting up the servers). The set of servers is denoted by $\wp$ and the set of servers known by every server to be corrupt is denoted Corr (it is assumed that Corr is initially empty)

It is assumed that each server has secure public key encryption and signature schemes. For a message M, let $ENC_{P_i}(M)$ denote the encryption of M using server $P_i$'s public key, and let $SIG_{P_i}(M)$ denote server $P_i$'s signature on message M.

It is also assumed there exist two (large) primes p and q such that q divides p−1. $Z_p$ denotes the unique field with p elements, and $Z^*_p$ denotes the multiplicative subgroup of $Z_p$. The circuit to be securely computed by the servers will be an arithmetic circuit over $Z_q$, $G_q$ denotes the unique subgroup of $Z^*_p$ of order q, with g being any generator of $G_q$, h is denoted as an element of $G_q$ such that no server knows $\log_g(h)$. The choice of g and h can be determined either by a network administrator or jointly by the servers using a coin flipping protocol.

Shares of the secret will be distributed among the servers much like in Shamir secret sharing. As noted above, Shamir secret sharing was described by Adi Shamir, in "How to share a secret," Commun. ACM, 22(11):612-613, 1979, which is hereby incorporated by reference as though fully set forth herein. Each server $P_i$ is assigned an evaluation point $\alpha_i$ on a polynomial as their share of the secret. Later, $\beta_j$ is used to denote the share of a server $S_j$. Provided below is a table illustrating symbols as used in the protocol according to the principles of the present invention.

| | Table of Symbols Used in Protocol Description |
|---|---|
| $\wp$ | The set of servers currently on-line and engaged in the protocols. |
| n | The number of servers currently on-line and engaged in the protocols, |
| t | The maximum number of servers that a malicious party can corrupt without revealing the secret. This is called the threshold of corruption, |
| d | The degree of the polynomial used to share the secret, |
| $\wp$', n', t', d' | Same as above, except that these are for the new set of servers. |
| Corr | The set of servers known by every server to be corrupt. |
| g, h | Elements of the (unique) multiplicative subgroup $Z_p^*$ of order q. These are used for the Pedersen committments. |
| $P_i$ | A server in $\wp$. |
| $\alpha_i$ | The evaluation point of server $P_i$. This determines which share of the secret $P_i$ will get |
| $S_j$ | A server in $\wp$'. |
| $\beta_j$ | The evaluation point of server $S_j$. |
| $ENC_{P_i}(M)$ | The encryption of message M using server $P_i$'s public key. |
| $SIG_{P_i}(M)$ | Server $P_i$'s signature for message $M$. |
| $Z_q$ | The (unique) finite field with q elements. |

Given the designations above, the following protocol allows a dealer ($P_D$) to share a secret using Pedersen commitments. Pedersen commitments were described by Torben P. Pedersen, in "Non-interactive and information-theoretic secure verifiable secret sharing," In Joan Feigenbaum, editor, CRYPTO, volume 576 of Lecture Notes in Computer Science, pages 129-140, Springer, 1991, which is incorporated by reference as though fully set forth herein.

The following protocol according to the principles of the present invention is designated Secret-Share (t, $P_j$, s, $\wp$, Corr). In the following steps, server $P_j$ shares secret s among the set of servers $\wp$.

1. Share/Commitment Distribution $_j$ picks a random degree d−1 polynomial $\tilde{u}(x)$ sets $u(x)=s+x\tilde{u}(x)=u_0+u_1x+ \ldots +u_dx^d$. $P_j$ also picks a random degree d polynomial $v(x)=v_0+v_1x+ \ldots +v_dx^d$.

ii. $P_j$ computes $\in_k=g^{u_k}h^{v_k}$ for each $k=0, \ldots, d$ and broadcasts $VSS_{P_j}=(j, \{ENC_{P_i}[u(\alpha_i), v(\alpha_i)]\}_{i=1}^n, \{\in_k\}_{k=0}^d)$ (where j is the index of server $P_j$), as well as $SIG_{P_j}(VSS_{P_j})$, wherein VSS denotes Verifiable Secret Sharing.

2. Error Detection i. Each $P_i \notin$ Corr decrypts the message sent by $P_j$ to find $u(\alpha_i), v(\alpha_i)$ and verifies that $$g^{u(\alpha_i)}h^{v(\alpha_i)} =^? \prod_{k=0}^{d} (\epsilon_k)^{\alpha_i^k}.$$

ii. Any $P_i \notin Corr$ who detected a fault in step 2(i) broadcasts $ACC_{P_i}=$(i, accuse, j, RAND) (where RAND is an arbitrary random field element) and $SIG_{P_i}(ACC_{P_i})$.

iii. For each properly signed accusation (from server $P_i$) made in step 2(ii), $P_j$ broadcasts (j, defense, i, [u($\alpha_i$), v($\alpha_i$)], $RAND_i$), where $RAND_i$ is the randomness that was used to encrypt the message for $P_i$ in step 1(ii).

iv. Each server checks to see if the defenses broadcast in step 2(iii) are correct (i.e., the defense was well-formed, the pair encrypts to the same message broadcast in step 1(ii) when the given randomness is used, and the pair passes the check in step 2(i)). For each accusation that was rebutted with a correct defense, the accuser is added to Corr. If any accusation was not correctly rebutted, $P_j$ is added to Corr. (The adversary can generate spurious defenses that do not pass the required check, so the servers just look to see if there is any correct defense. This applies to all later protocols that utilize accusation/defense.) If $P_j$ is not found to be corrupt, then the protocol terminates successfully.

The communication complexity of the Secret-Share protocol is O(n) elements from the field $Z_q$. Throughout the rest of this document, the protocols measure communication complexity in terms of elements from this field. Secret-Share takes 3 rounds of communication. Multiple instances of Secret-Share can be run in parallel without affecting the round complexity.

Once a secret s has been shared using Secret-Share, [s] denotes the sharing of this secret (i.e., the collection of all shares of this secret held by all the servers). Let V be a Vandermonde matrix over $Z_q$ with n rows and n−t columns, and let $M=V^T$. It was shown by Damgard and Nielsen in "Scalable and unconditionally secure", multiparty computation, In CRYPTO, pages 572-590, 2007 (which is incorporated by reference as though fully set forth herein), that if x is an n-dimensional vector and n−t of its coordinates have a uniformly random distribution, then all the coordinates of Mx have a uniformly random distribution. It is assumed there is a publicly known M, fixed for each stage of the protocol. (Since the size of M is dependent on n and t, one obviously might have to change it when the threshold (and hence the number of servers) changes. This does not actually add to the overall complexity of the protocol, because assuming there is an upper bound on n, a matrix can be generated for this maximal n once at the beginning of the protocol, and then each time the threshold is changed, use a truncated version of the matrix, which can be achieved simply by removing some rows and columns from the matrix).

The following protocol, referred to as GenPoly(t, $\wp$, Corr, l, D), creates l random polynomials with Pedersen commitments in parallel. In the following steps, the servers in $\wp$ generate l random polynomials of degree D. Note that the degree of the polynomials used to share the secret is d, and it is possible for D≠d.

1. Proposal Distribution
   i. l' is defined to be the integer ceiling of l/(n−t). Each server $P_i \notin Corr$ generates 2l' random polynomials $\{(Q_i^{(k)}, \gamma_i^{(k)})\}_{k=1}^{l'}$ with $deg(Q_i^{(k)})=deg(\gamma_i^{(k)})=D$. Thus, $Q_i^{(k)}(x)=q_{i,0}^{(k)}+q_{i,1}^{(k)}x+\ldots+q_{i,D}^{(k)}x^D$ (and the coefficients for $\gamma_i^{(k)}$ are similarly $\gamma_{i,j}^{(k)}$). $\gamma_i^{(k)}$ is the auxiliary polynomial for $Q_i^{(k)}$.
   ii. Each server $P_i \notin Corr$ computes $\in_{i,j}^{(k)}=g^{q_{i,j}^{(k)}}h^{\gamma_{i,j}^{(k)}}$, then broadcasts $VSS_{P_i}=$(i, $\{\{ENC_{P_m}[Q_i^{(k)}(\alpha_m), \gamma_i^{(k)}(\alpha_m)]\}_{m=1}^{n}, \{\in_{i,j}^{(k)}\}_{j=0}^{D}\}_{k=1}^{l'}$) and $SIG_{P_i}(VSS_{P_i})$.

iii. Each server that did not produce a properly signed message in the previous step is added to Corr.

2. Error Detection
   i. Each server $P_i \notin Corr$ checks for each pair $[Q_m^{(k)}(\alpha_i), \gamma_m^{(k)}(\alpha_i)]$ received in the previous step that $$g^{Q_m^{(k)}(\alpha_i)}h^{\gamma_m^{(k)}(\alpha_i)} =? \prod_{j=0}^{D} \left(\epsilon_{m,j}^{(k)}\right)^{\alpha_i^j}.$$

ii. If $P_i$ detected an error in the previous step with the pair $[Q_m^{(k)}(\alpha_i), \gamma_m^{(k)}(\alpha_i)]$, he/she broadcasts $ACC_{P_i}=$(i, accuse, m, k, RAND) (where RAND is an arbitrary random field element) and $SIG_{P_i}(ACC_{P_i})$. $P_i$ broadcasts an accusation no more than once for each $P_m$, although there may be more than one accusation per k.
   iii. If $P_i$ was accused (with a properly signed accusation) in the previous step, the accused broadcasts his/her (purported) pair of values along with the randomness $RAND_{i,m,k}$ that was used to encrypt it in step 1(ii), (i, defense, m, $[Q_i^{(k)}(\alpha_m), \gamma_i^{(k)}(\alpha_m)]$, $RAND_{i,m,k}$).
   iv. Each server checks to see if the defenses broadcast in step 2(iii) are correct (i.e., the defense was well-formed, the pair encrypts to the same message broadcast in step 1(ii) when the given randomness is used, and the pair passes the check in step 2(i)). For each accusation that was rebutted with a correct defense, the accuser is added to Corr. For each accusation that was not correctly rebutted, the accused server is added to Corr. v. For each $P_i \in Corr$ and each k, $Q_i^{(k)}$ is defined to be the all-zero polynomial. Each batch k of n polynomials will be converted into a batch of n−t polynomials as follows:

$$(R^{((k-1)(n-t)+1)}, R^{((k-1)(n-t)+2)}, \ldots, R^{(k(n-t))})^T = M(Q_1^{(k)}, Q_2^{(k)}, \ldots, Q_n^{(k)})^T$$

(this operation makes sense if M is considered as a matrix with elements in $Z_q[x]$, the ring of polynomials with coefficients in $Z_q$). The $\gamma_i^{(k)}$ is similarly used to construct the auxiliary polynomials for the $R^{(s)}$. Each server computes the Pedersen commitments for these polynomials. The output is the set of evaluation points of $\{R^{(s)}\}_{s=1}^{l}$ held by each of the servers, along with the evaluation points for the corresponding auxiliary polynomials. Each server $P_i$ can compute its share of a polynomial $R^{(s)}$ by using the following equation:

$$(R^{((k-1)(n-t)+1)}(\alpha_i), R^{((k-1)(n-t)+2)}(\alpha_i), \ldots, R^{(k(n-t))}(\alpha_i))^T = M(Q_1^{(k)}(\alpha_i), Q_2^{(k)}(\alpha_i), \ldots, Q_n^{(k)}(\alpha_i))^T$$

The communication complexity of the GenPoly protocol is $O(l \cdot n+n^2)$ field elements (assuming that D=O(n)). It takes 3 rounds of communication. Note that multiple instances of GenPoly can be invoked in parallel, even if the degrees of the generated polynomials are different.

The following protocol allows for redistribution of a secret to a new set of servers. It is described in such a way that the set of old servers ($\wp$) and the set of new servers ($\wp'$) are disjoint. However, it can easily be adapted to allow some (or all) of the servers in the new group to be in the old group. This is done as follows. Each server $P_i$ from the old group who is to be included in the new group is given a new identity $S_j$, complete with new encryption and signature schemes $ENC_{S_j}, SIG_{S_j}$. In essence, there is one real server in control of two virtual servers $P_i$ and $S_j$. Once the share redistribution is complete, the real server erases all data associated with the virtual server $P_i$ and keeps all data associated with $S_j$.

Let $\alpha_i$ denote the evaluation point of a server $P_i \in \wp$ and $\beta_j$ denotes the evaluation point of a server $S_j \in \wp'$. It is required that $\alpha_i \neq \beta_j$ for all pairs (i, j), unless $P_i$ and $S_j$ correspond to the same real server. [s] is used to denote a sharing of the secret s.

The following protocol, referred to as Secret—Redistribute(t, $\wp$, Corr, t', $\wp'$, [s]), assumes that the secret s to be redistributed has been correctly shared with polynomial u and auxiliary polynomial v (both of degree d) and that the Pedersen commitments for these polynomials are known to all servers in $\wp$. The threshold of corruption for the set of servers in $\wp$ is t, and the threshold of corruption for the set of servers in $\wp'$ is t'.

1. Polynomial Generation. Invoke GenPoly(t, $\wp$, Corr, n'+1,d'-1) to generate Q and $\{R^{(j)}\}_{j=1}^{n'}$ of degree d'-1 auxiliary polynomials $\gamma$ and $\{\zeta^{(j)}\}_{j=1}^{n'}$, respectively. If the threshold is decreasing (i.e., t'<t and d'<d), also invoke GenPoly(t, $\wp$, Corr,1,d') in parallel with the above invocation to generate W of degree d' with auxiliary polynomial $\zeta$ (the $k^{th}$ coefficient of Q is $q_k$, and similarly for $R^{(j)}, W, \gamma, \zeta^{(j)}$, and $\zeta$). Note that all servers in $\wp'$ must be on-line before executing GenPoly so that they can see the broadcast commitments.

2. Lowering the Degree. If the threshold is decreasing, the following steps are performed:
   i. Each $P_i \notin$ Corr broadcasts $SH_{P_i} = [u(\alpha_i) + W(\alpha_i), v(\alpha_i) + \zeta(\alpha_i)]$ and $SIG_{P_i}(SH_{P_i})$.
   ii. Each server checks that the broadcast shares are correct given the Pedersen commitments, i.e., they check if $g^{u(\alpha_i)+W(\alpha_i)}h^{v(\alpha_i)+\zeta(\alpha_i)} =^? g^{u(\alpha_i)}h^{v(\alpha_i)} \Pi (g^{w_k}h^{\zeta_k})^{\alpha_i^k}$ Remember that the commitments $g^{w_k}h^{\zeta_k}$ are publicly known, as they were broadcast during the invocation of the GenPoly protocol. Servers who broadcasted faulty shares are added to Corr.
   iii. The servers interpolate u+W from the correct shares. It should be noted that interpolation refers to computing the secret from the shares/evaluation points. Let H denote the highest-order d-d' terms of u+W (i.e., u+W is a degree d polynomial, but u+W-H is a degree d' polynomial). The polynomial u is now replaced with u-H, which lowers the degree of u without changing the secret. All servers internally update their shares, as well as updating the commitments corresponding to u. The same process is performed (in parallel with the above steps) for v with $\zeta$.

3. Commitment Transfer
   i. Each $P_i \notin$ Corr broadcasts the commitments for the old secret sharing polynomial for the servers in the new group, i.e., $$g^{\theta_{i,j}}h^{\phi_{i,j}} =^? g^{u(\alpha_i)}h^{v(\alpha_i)} \prod_{k=0}^{d'-1} (g^{q_k}h^{\gamma_k})^{\alpha_i^{k+1}} \left(g^{r_k^{(j)}}h^{\zeta_k^{(j)}}\right)^{\alpha_i^{k+1}} \left(g^{r_k^{(j)}}h^{\zeta_k^{(j)}}\right)^{-\beta_j \alpha_i^k}$$

where $\tilde{d}$ is either d or d' depending on whether step 2 was executed.
   ii. Each $S_j$ determines the correct values for the commitments broadcast in the previous step by siding with the majority.

4. Share Transfer and Interpolation
   i. Each $P_i \notin$ Corr computes $\theta_{i,j} = u(\alpha_i) + \alpha_i Q(\alpha_i) + (\alpha_i - \beta_j) R^{(j)}(\alpha_i)$ and $\phi_{i,j} = v(\alpha_i) + \alpha_i \gamma(\alpha_i) + (\alpha_i - \beta_j) \zeta^{(j)}(\alpha_i)$ and broadcasts $VSS_{P_i} = \{ENC_{S_j}[\theta_{i,j}, \phi_{i,j}]\}_{j=1}^{n'}$ and $SIG_{P_i}(VSS_{P_i})$. The idea is that for $S_j$, the servers in the old group mask u with the polynomial $xQ(x)+(x-\beta_j)R^{(j)}(x)$, and similarly for v.
   ii. Each $S_j$ checks whether the values broadcast in step 4(i) are correct given the publicly known Pedersen commitments. That is, $S_j$ checks if $$COM_{P_i} = \{g^{u_k}h^{v_k}\}_{k=0}^{\tilde{d}} \text{ and } SIG_{P_i}(COM_{P_i}),$$

iii. The new sharing polynomial is defined to be u'(x)=u(x)+xQ(x), and similarly the new auxiliary polynomial is v'=v(x)+x$\gamma$(x). Since $(x-\beta_j)R^{(j)}(x)$ evaluates to zero at $x=\beta_j$, $S_j$ can deduce u'($\beta_j$) from the points on $u'(x)+(x-\beta_j)R^{(j)}(x)$ sent to him by the servers in the old group (and similarly for v'($\beta_j$)). So each $S_j$ uses all the shares that passed the check in step 4(ii) to interpolate his new share u'($\beta_j$), as well as v'($\beta_j$).

5. Data Erasure
   i. Each $P_i \in \wp$ erases all their data.

The communication complexity of the protocol Secret-Redistribute is $O(n^2)$ field elements. It takes 6 rounds of communication (but only 5 if the degree of the sharing polynomial is not being lowered).

The following protocol opens a sharing [s] of a secret s that has been shared with Secret-Share and may have been redistributed with the Secret-Redistribute protocol.

The protocol Secret—Open(t, $\wp$, [s]) proceeds as follows. It is assumed that the secret s has been shared with polynomial u and auxiliary polynomial v (both of degree d). If the $k^{th}$ coefficient of u is $u_k$ (and similarly for $v_k$), then it is assumed that the Pedersen commitments $\in_k = g^{u_k}h^{v_k}$ for each k=0, . . . , d are publicly known, with the protocol proceeding as follows:

1. Each server $P_i$ broadcasts his shares $SH_{P_i} = [u(\alpha_i), v(\alpha_i)]$ and $SIG_{P_i}(SH_{P_i})$.
2. Each server checks for each pair of points $u(\alpha_j), v(\alpha_j)$ received in the previous step that $g^{u(\alpha_j)}h^{v(\alpha_j)} =^? \Pi(\in_k)^{\alpha_j^k}$.
3. Each server uses all the points that passed the check in step 2 to interpolate the secret s=u(0). Any algorithm for polynomial interpolation will work, a non-limiting example of which includes the algorithm described by Alfred V. Aho, John E. Hopcroft, and J. D. Ullman, in "The Design and Analysis of Computer Algorithms," Addison-Wesley, 1974, which is hereby incorporated by reference as though fully set forth herein.

The communication complexity of the Secret-Open protocol is O(n) field elements. It takes 1 round of communication. Multiple instances of the Secret-Open protocol can be invoked in parallel while still taking only 1 round of communication.

What is claimed is:
1. A system for mobile proactive secret sharing amongst a set of servers, the system comprising:
    a set of servers, each server having one or more processors and a memory, the memory having executable instructions encoded thereon, such that upon execution of the instructions, the servers in the set of servers perform operations of:

initializing, by the set of servers, a Secret-Share protocol to share, by server $P_j$, a secret s among the set of servers $\mathcal{P}$, such that a degree of polynomials used to share the secret s is d and a shared secret is denoted as [s];

initializing, by the set of servers, a GenPoly protocol to cause the servers in the set of servers $\mathcal{P}$ to generate l random polynomials of degree D;

initializing, by the set of servers, a Secret-Redistribute protocol to redistribute the shared secret [s] to a set of new servers $\mathcal{P}$ ';

initializing, by the set of servers, a Secret-Open protocol to open the shared secret [s];

wherein initializing the Secret-Redistribute protocol further comprises operations of:

performing the GenPoly protocol in parallel to generate random polynomials;

if a threshold is decreasing, then performing the following operations:
 i. for each server $P_i$ that is not in the list of known corrupted servers Corr, broadcasting its share of a secret-sharing polynomial, masked with a random polynomial;
 ii. for each server, verifying that the broadcast shares are correct given Pedersen commitments;
 iii. constructing a polynomial of lower degree sharing the same secret by using correct shares;

transferring Pedersen commitments as follows:
 i. for each server $P_i$ that is not in Corr, broadcasting Pedersen commitments for an old secret sharing polynomial for servers $S_j$ in a new group;
 ii. for each server $S_j$, determining correct values for the Pedersen commitments broadcast in the previous step by a set of Pedersen commitments that are broadcast by a majority of the servers;

transferring shares and interpolating as follows:
 i. for each server $P_i$ that is not in Corr computing shares of masked secret-sharing polynomials and broadcasting the encrypted shares;
 ii. for each $S_j$, verifying that the encrypted shares broadcast above are correct given known Pedersen commitments;
 iii. for each $S_j$, using all encrypted shares that are determined to be correct to interpolate new shares; and for each server $P_i$ in the set of servers, erasing all of its data.

2. The system as set forth in claim 1, wherein initializing the Secret-Share protocol further comprises operations of:
distributing the shared secret as follows:
 i. picking a random degree polynomial;
 ii. for each server, computing Pedersen commitments and broadcasting Pedersen commitments and encrypted shares;
detecting an error as follows:
 i. for each server that receives the shared secret, decrypting the message and verifying that the Pedersen commitments correspond to the received shares;
 ii. for any server that detects that the Pedersen commitments do not correspond to the received shares, said server being an accusing server and broadcasting an accusation amongst the set of servers that a sending server is corrupt;
 iii. broadcasting, by the sending server, a defense to rebut the accusation;
 iv. for each server, determining if the defense is accurate, such that if the accusation is not correctly rebutted, server $P_j$ is added to a list of known corrupted servers Corr, and if the accusation is correctly rebutted, then the accusing server is added to Corr, with the protocol terminating if $P_j$ is not found to be corrupt.

3. The system as set forth in claim 2, wherein initializing the GenPoly protocol further comprises operations of:
distributing as follows:
 i. for each server $P_i$ that is not in the list of known corrupted servers Corr, generating random polynomials;
 ii. for each said server that generates random polynomials that is not in Corr, computing Pedersen commitments, with each server then broadcasting the Pedersen commitments and encrypted shares,
 iii. adding to Corr each server $P_i$ that did not broadcast Pedersen commitments;
detecting error(s) as follows:
 i. for each server $P_i$ that is not in Corr, determining that each pair of shares received above corresponds to the Pedersen commitments;
 ii. for any server $P_i$ that detects that the Pedersen commitments do not correspond to the received pair of shares, said server being an accusing server and broadcasting an accusation amongst the set of servers that a sending server is corrupt;
 iii. if a server is accused, the accused server broadcasting a rebuttal defense that includes the correct pair of shares along with a randomness key that was used to encrypt a pair of values;
 iv. for each server, determining if the defense is accurate, such that if the accusation is not correctly rebutted, the accused server $P_i$ is added to a list of known corrupted servers Corr, and if the accusation is correctly rebutted, then the accusing server is added to Corr; and
 v. for each server $P_i$, computing its share of an output polynomial.

4. The system as set forth in claim 3, wherein initializing the Secret-Redistribute protocol further comprises operations of:
performing the GenPoly protocol in parallel to generate random polynomials;
if a threshold is decreasing, then performing the following operations:
 i. for each server $P_i$ that is not in the list of known corrupted servers Corr, broadcasting its share of a secret-sharing polynomial, masked with a random polynomial;
 ii. for each server, verifying that the broadcast shares are correct given Pedersen commitments;
 iii. constructing a polynomial of lower degree sharing the same secret by using correct shares;
transferring Pedersen commitments as follows:
 i. for each server $P_i$ that is not in Corr, broadcasting Pedersen commitments for an old secret sharing polynomial for servers $S_j$ in a new group;
 ii. for each server $S_j$, determining correct values for the Pedersen commitments broadcast in the previous step by a set of Pedersen commitments that are broadcast by a majority of the servers;
transferring shares and interpolating as follows:
 i. for each server $P_i$ that is not in Corr computing shares of masked secret-sharing polynomials and broadcasting the encrypted shares;

ii. for each $S_j$, verifying that the encrypted shares broadcast above are correct given known Pedersen commitments;

iii. for each $S_j$, using all encrypted shares that are determined to be correct to interpolate new shares; and for each server $P_i$ in the set of servers, erasing all of its data.

5. The system as set forth in claim 4, wherein initializing the Secret-Open protocol further comprises operations of:

for each server $P_i$, broadcasting its shares and signature for the shares;

for each server $P_i$, verifying for each pair of points that correspond to the broadcast shares, that the shares correspond to the Pedersen commitments; and for each server $P_i$, for all the points in which the shares correspond to the Pedersen Commitments, interpolating the secret.

6. The system as set forth in claim 1, wherein initializing the GenPoly protocol further comprises operations of:

distributing as follows:
 i. for each server $P_i$ that is not in the list of known corrupted servers Corr, generating random polynomials;
 ii. for each said server that generates random polynomials that is not in Corr, computing Pedersen commitments, with each server then broadcasting the Pedersen commitments and encrypted shares;
 iii. adding to Corr each server $P_i$ that did not broadcast Pedersen commitments;

detecting error(s) as follows:
 i. for each server $P_i$ that is not in Corr, determining that each pair of shares received above corresponds to the Pedersen commitments;
 ii. for any server $P_i$ that detects that the Pedersen commitments do not correspond to the received pair of shares, said server being an accusing server and broadcasting an accusation amongst the set of servers that a sending server is corrupt;
 iii. if a server is accused, the accused server broadcasting a rebuttal defense that includes the correct pair of shares along with a randomness key that was used to encrypt a pair of values;
 iv. for each server, determining if the defense is accurate, such that if the accusation is not correctly rebutted, the accused server $P_i$ is added to a list of known corrupted servers Corr, and if the accusation is correctly rebutted, then the accusing server is added to Corr; and
 v. for each server $P_i$, computing its share of an output polynomial.

7. The system as set forth in claim 1, wherein initializing the Secret-Open protocol further comprises operations of:

for each server $P_i$, broadcasting its shares and signature for the shares;

for each server $P_i$, verifying for each pair of points that correspond to the broadcast shares, that the shares correspond to the Pedersen commitments; and for each server $P_i$, for all the points in which the shares correspond to the Pedersen Commitments, interpolating the secret.

8. A computer program product for mobile proactive secret sharing amongst a set of servers, the computer program product comprising:

a non-transitory computer-readable medium having executable instructions encoded thereon, such that upon execution of the instructions by servers in the set of servers, the servers in the set of servers perform operations of:

initializing, by the set of servers, a Secret-Share protocol to share, by server $P_j$, a secret s among the set of servers $\wp$, such that a degree of polynomials used to share the secret s is d and a shared secret is denoted as [s];

initializing, by the set of servers, a GenPoly protocol to cause the servers in the set of servers $\wp$ to generate l random polynomials of degree D;

initializing, by the set of servers, a Secret-Redistribute protocol to redistribute the shared secret [s] to a set of new servers $\wp'$;

initializing, by the set of servers, a Secret-Open protocol to open the shared secret [s];

wherein initializing the Secret-Redistribute protocol further comprises operations of:

performing the GenPoly protocol in parallel to generate random polynomials;

if a threshold is decreasing, then performing the following operations:
 iv. for each server $P_i$ that is not in the list of known corrupted servers Corr, broadcasting its share of a secret-sharing polynomial, masked with a random polynomial;
 v. for each server, verifying that the broadcast shares are correct given Pedersen commitments;
 vi. constructing polynomial of lower degree sharing the same secret by using correct shares;

transferring Pedersen commitments as follows:
 i. for each server $P_i$ that is not in Corr, broadcasting Pedersen commitments for an old secret sharing polynomial for servers $S_j$ in a new group;
 ii. for each server $S_j$, determining correct values for the Pedersen commitments broadcast in the previous step by a set of Pedersen commitments that are broadcast by a majority of the servers;

transferring shares and interpolating as follows:
 iv. for each server $P_i$ that is not in Corr computing shares of masked secret-sharing polynomials and broadcasting the encrypted shares;
 v. for each $S_j$, verifying that the encrypted shares broadcast above are correct given known Pedersen commitments;
 vi. for each $S_j$, using all encrypted shares that are determined to be correct to interpolate new shares; and for each server $P_i$ in the set of servers, erasing all of its data.

9. The computer program product as set forth in claim 8, wherein initializing the Secret-Share protocol further comprises operations of:

distributing, the shared secret as follows:
 i. picking a random degree polynomial;
 ii. for each server, computing Pedersen commitments and broadcasting Pedersen commitments and encrypted shares;

detecting an error as follows:
 i. for each server that receives the shared secret, decrypting the message and verifying that the Pedersen commitments correspond to the received shares;
 ii. for any server that detects that the Pedersen commitments do not correspond to the received shares, said server being an accusing server and broadcasting an accusation amongst the set of servers that a sending server is corrupt;

iii. broadcasting, by the sending server, a defense to rebut the accusation;

iv. for each server, determining if the defense is accurate, such that if the accusation is not correctly rebutted, server $P_j$ is added to a list of known corrupted servers Corr, and if the accusation is correctly rebutted, then the accusing server is added to Corr, with the protocol terminating if $P_j$ is not found to be corrupt.

10. The computer program product as set forth in claim 8, wherein initializing the GenPoly protocol further comprises operations of:

distributing, as follows:
i. for each server $P_i$ that is not in the list of known corrupted servers Corr, generating random polynomials;
ii. for each said server that generates random polynomials that is not in Corr, computing Pedersen commitments, with each server then broadcasting the Pedersen commitments and encrypted shares,
iii. adding to Corr each server $P_i$ that did not broadcast Pedersen commitments;

detecting error(s) as follows:
for each server $P_i$ that is not in Corr, determining that each pair of shares received above corresponds to the Pedersen commitments;
ii. for any server $P_i$ that detects that the Pedersen commitments do not correspond to the received pair of shares, said server being an accusing server and broadcasting an accusation amongst the set of servers that a sending server is corrupt;
iii. if a server is accused, the accused server broadcasting a rebuttal defense that includes the correct pair of shares along with a randomness key that was used to encrypt a pair of values;
iv. for each server, determining if the defense is accurate, such that if the accusation is not correctly rebutted, the accused server $P_i$ is added to a list of known corrupted servers Corr, and if the accusation is correctly rebutted, then the accusing server is added to Corr; and
v. for each server $P_i$, computing its share of an output polynomial.

11. The computer program product as set forth in claim 8, wherein initializing the Secret-Open protocol further comprises operations of:

for each server $P_i$, broadcasting its shares and signature for the shares;

for each server $P_i$, verifying for each pair of points that correspond to the broadcast shares, that the shares correspond to the Pedersen commitments; and for each server $P_i$, for all the points in which the shares correspond to the Pedersen Commitments, interpolating the secret.

12. A computer implemented method for mobile proactive secret sharing amongst a set of servers, the method comprising an act of:

causing one or more servers in a set of servers to execute instructions encoded on a non-transitory computer-readable medium, such that upon execution, the servers in the set of servers perform operations of:

initializing, by the set of servers, a Secret-Share protocol to share, by server $P_j$, a secret s among the set of servers $\mathcal{P}$, such that a degree of polynomials used to share the secret s is d and a shared secret is denoted as [s];

initializing, by the set of servers, a GenPoly protocol to cause the servers in the set of servers $\mathcal{P}$ to generate l random polynomials of degree D;

initializing, by the set of servers, a Secret-Redistribute protocol to redistribute the shared secret [s] to a set of new servers $\mathcal{P}'$;

initializing, by the set of servers, a Secret-Open protocol to open the shared secret [s];

wherein initializing the Secret-Redistribute protocol further comprises operations of:

performing the GenPoly protocol in parallel to generate random polynomials;

if a threshold is decreasing, then performing the following operations:
vii. for each server $P_i$ that is not in the list of known corrupted servers Corr, broadcasting its share of a secret-sharing polynomial, masked with a random polynomial;
viii. for each server, verifying that the broadcast shares are correct given Pedersen commitments;
ix. constructing a polynomial of lower degree sharing the same secret by using correct shares;

transferring Pedersen commitments as follows:
i. for each server $P_i$ that is not in Corr, broadcasting Pedersen commitments for an old secret sharing polynomial for servers $S_j$ in a new group;
ii. for each server $S_j$, determining correct values for the Pedersen commitments broadcast in the previous step by a set of Pedersen commitments that are broadcast by a majority of the servers;

transferring shares and interpolating as follows:
vii. for each server $P_i$ that is not in Corr computing shares of masked secret-sharing polynomials and broadcasting the encrypted shares;
viii. for each $S_j$, verifying that the encrypted shares broadcast above are correct given known Pedersen commitments;
ix. for each $S_j$, using all encrypted shares that are determined to be correct to interpolate new shares; and for each server $P_i$ in the set of servers, erasing all of its data.

13. The method as set forth in claim 12, wherein initializing the Secret-Share protocol further comprises operations of:

distributing the shared secret as follows:
i. picking a random degree polynomial;
ii. for each server, computing Pedersen commitments and broadcasting Pedersen commitments and encrypted shares;

detecting an error as follows:
i. for each server that receives the shared secret, decrypting the message and verifying that the Pedersen commitments correspond to the received shares;
ii. for any server that detects that the Pedersen commitments do not correspond to the received shares, said server being an accusing server and broadcasting an accusation amongst the set of servers that a sending server is corrupt;

iii. broadcasting, by the sending server, a defense to rebut the accusation;

iv. for each server, determining if the defense is accurate, such that if the accusation is not correctly rebutted, server $P_j$ is added to a list of known corrupted servers Corr, and if the accusation is correctly rebutted, then the accusing server is added to Corr, with the protocol terminating if $P_j$ is not found to be corrupt.

14. The method as set forth in claim 12, wherein initializing the GenPoly protocol further comprises operations of:

distributing as follows:
  i. for each server $P_i$ that is not in the list of known corrupted servers Corr, generating random polynomials;
  ii. for each said server that generates random polynomials that is not in Corr, computing Pedersen commitments, with each server then broadcasting the Pedersen commitments and encrypted shares,
  iii. adding to Corr each server $P_i$ that did not broadcast Pedersen commitments;

detecting error(s) as follows:
  i. for each server $P_i$ that is not in Corr, determining that each pair of shares received above corresponds to the Pedersen commitments;
  ii. for any server $P_i$ that detects that the Pedersen commitments do not correspond to the received pair of shares, said server being an accusing server and broadcasting an accusation amongst the set of servers that a sending server is corrupt;
  iii. if a server is accused, the accused server broadcasting a rebuttal defense that includes the correct pair of shares along with a randomness key that was used to encrypt a pair of values;
  iv. for each server, determining if the defense is accurate, such that if the accusation is not correctly rebutted, the accused server $P_i$ is added to a list of known corrupted servers Corr, and if the accusation is correctly rebutted, then the accusing server is added to Corr; and
  v. for each server $P_i$, computing its share of an output polynomial.

15. The method as set forth in claim 12, wherein initializing the Secret-Open protocol further comprises operations of:

for each server $P_i$, broadcasting its shares and signature for the shares;

for each server $P_i$, verifying for each pair of points that correspond to the broadcast shares, that the shares correspond to the Pedersen commitments; and for each server $P_i$, for all the points in which the shares correspond to the Pedersen Commitments, interpolating the secret.

* * * * *